United States Patent Office 3,515,031
Patented June 2, 1970

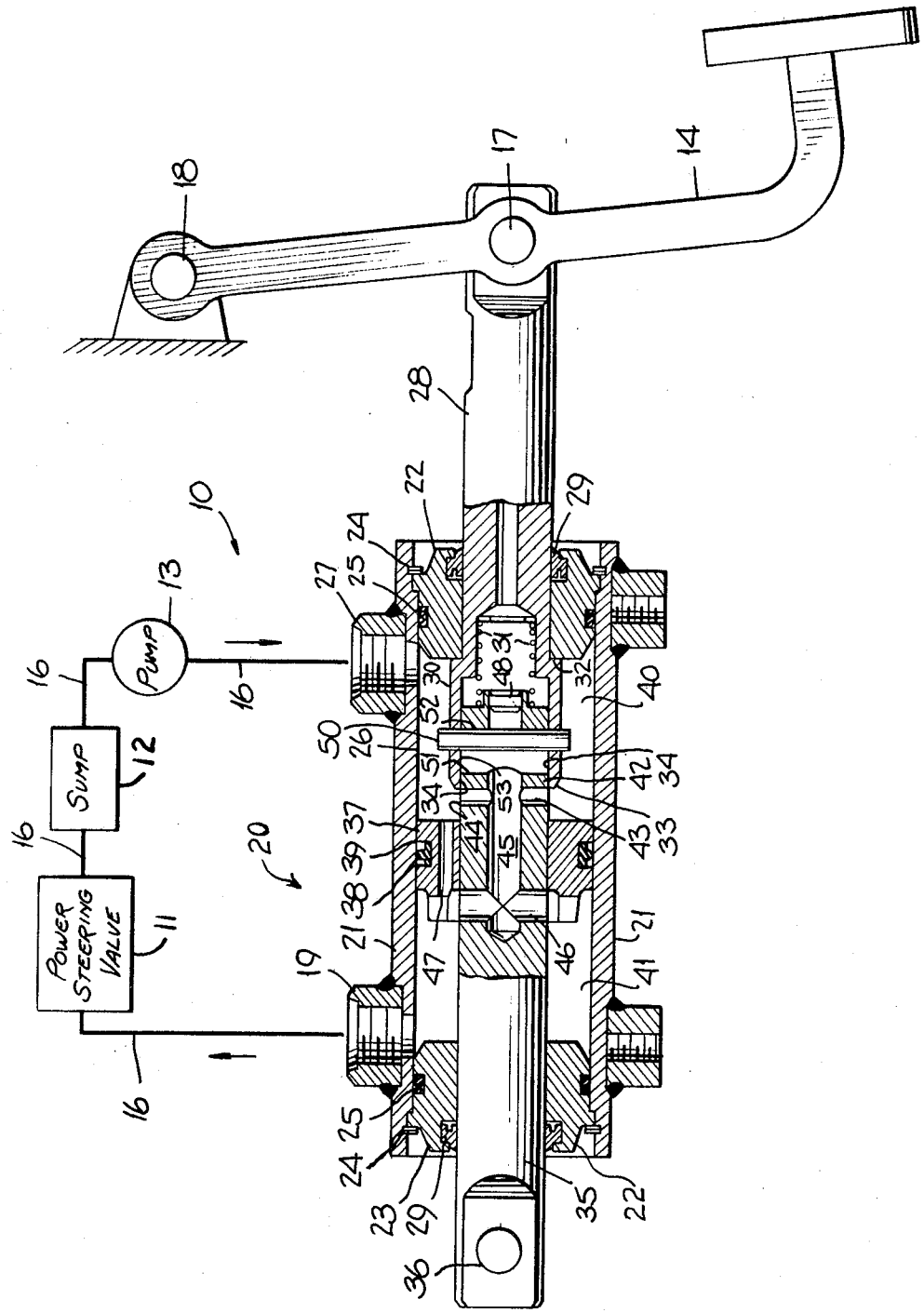

3,515,031
HYDRAULIC BOOSTER MOTOR
John C. McPherson, Philadelphia, Pa., assignor to Eaton Yale & Towne Inc., Cleveland, Ohio, a corporation of Ohio
Filed Nov. 6, 1967, Ser. No. 680,801
Int. Cl. F15b *13/04, 9/08*
U.S. Cl. 91—49                                    8 Claims

ABSTRACT OF THE DISCLOSURE

A hydraulic motor for use in a hydraulic system which employs a single pump for circulating fluid to one or more hydraulic mechanisms. The motor has a piston with passages formed therein and valve means for restricting the passage openings such that free circulation of fluid is permitted in the hydraulic system at all times and free application of fluid back pressure to the system pump is permitted without affecting the motor operation.

BACKGROUND OF THE INVENTION

This invention relates to hydraulic motors and more particularly to hydraulic booster motors for use in assisting the manual operation of a mechanical device such as a clutch, brake, or the like. Such devices are operated by means of a foot pedal or other control which transmits a force through suitable linkage to effect engagement or disengagement of the operating components of the device. When large power requirements are needed to operate such devices, it is common practice to employ hydraulic booster motors to assist in the operation thereof.

It is common to hydraulically connect such hydraulic booster motors in series in a hydraulic system which powers other hydraulically operated mechanisms, such as power steering mechanisms, so that a single pump may be used to provide fluid pressure for operating the system. It is apparent in such a hydraulic system, that the hydraulic mechanisms must operate in a manner not to interfere with one another. Thus, a hydraulically actuated power steering mechanism must be operable at all times, as well as the clutch or brake device. Moreover, each should be operable regardless of the operating condition of the other.

In prior art constructions of this class, various externally operated valve controls have been employed for developing a fluid pressure differential within a booster motor having a cylindrical casing between opposite faces of a piston. This differential causes the piston to move and the motion is used to operate a mechanical device. Heretofore, mechanisms of this class have not been entirely successful due to the fact that the valve controls employed required, when operated, continuous restriction of fluid flow in order to obtain the sufficient fluid pressure differential for operating the device. When used in a system having a single source of fluid pressure, the flow of fluid to other system hydraulic mechanisms is obviously impeded and at times, completely cut off.

Further, the operation of other system hydraulic mechanisms such as power steering mechanisms, generates back pressure in a system as outlined above. Therefore, if an external force is being applied such as from a foot pedal to the clutch booster mechanism while back pressure is being developed, the clutch may not operate as desired. That is the operator, being accustomed to a certain response from a certain foot pedal pressure, will not obtain the usual response upon exerting usual foot pedal pressure when back pressure is being encountered. Greater foot pedal pressure must then be exerted to obtain the same desired result, or the operator's foot may be exposed to a series of pressure pulses transmitted through the pedal causing a bumping erratic operation.

SUMMARY OF THE INVENTION

In accordance with a preferred embodiment of this invention, a hydraulic booster motor is provided in a hydraulic system including a pump, fluid reservoir and power steering mechanism for assisting manual operation of a mechanical device such as motor vehicle clutch or brake.

In order to avoid interfering with the operation of the power steering mechanism and to obviate the effects of system pressure differentials, the booster motor of this invention is provided with a piston and a piston control arrangement such that open fluid communication is maintained at all times through the booster motor.

Accordingly, it is an object of the present invention to provide an improved hydraulic booster motor that affords continuous circulation of fluids in a hydraulic system at all times so as not to affect the basic operation of the system.

Another object is to provide a hydraulic booster motor in a hydraulic system wherein motor operation is unaffected by back pressures transmitted from other hydraulic mechanisms.

BRIEF DESCRIPTION OF THE DRAWING

The drawing is a cross section view of parts of the hydraulic booster motor of this invention including a diagrammatical representation of the motor and other elements in the hydraulic system.

DESCRIPTION OF THE PREFERRED EMBODIMENT

Referring to the drawing, there is shown diagrammatically a basic hydraulic system 10 suitable for practicing the present invention. The system includes power steering valve 11, fluid sump 12, pump 13 and the hydraulic booster motor 20 of the invention. Fluid pressure for operating system units is transmitted from pump 13 through suitable conduits 16 which connect the hydraulic mechanisms of the system in series.

The booster motor 20 comprises generally a cylindrical casing 21 sealed by end plugs 22 and 23 which are retained by rings 24. Suitable fluid seals 25 are provided to prevent leakage between the casing bore 26 and the end plugs 22, 23.

Fluid from pump 13 is supplied through inlet port 27, casing 21 and outlet port 19 to power steering valve 11.

Foot pedal 14, pivoted at 18, operates to advance valve rod 28 through connection 17 when an external force is applied to pedal 14. Valve rod 28 extends through end plug 22 which is sealed at 29 to prevent leakage between them. Valve rod 28 has an enlarged annular valve sleeve 30 formed integral therewith at the end arranged within casing 21.

Piston rod 35 extends through end plug 23 in the same manner as valve rod 28 extends through end plug 22. End plug 23 also is similarly sealed at 29 and 25 and retained by ring 24 as end plug 22. Piston rod 35 has suitable connection means 36 for operating a mechanical device such as a clutch (not shown) at the end external from casing 21.

A piston head 37 is integrally formed or press fitted on piston rod 35 and is axially slidable between inlet port 27 and outlet port 28 thereby forming inlet chamber 40 and outlet chamber 41 within casing 21. The normal position of piston head 37 is shown in the drawing as is determined by bias means associated with the clutch. In the normal position, the shoulder 32 of the valve rod 28 abuts the end plug 22. To prevent leakage past piston head 37, annular ring seal 38 is provided within retaining groove 39 for sealing with casing bore 26.

An extension 42 on the inner end of piston rod 35 extends beyond piston head 37 into inlet chamber 40 and into close fitting engagement with bore 34 of valve sleeve 30. Gate passage 43 formed in extension 42 terminates in openings at 44 on the surface of extension 42 which communicate with inlet chamber 40 and with outlet chamber 41, axial passage 45, and radial passages 46. Plug 48 is inserted in the end face of extension 42 to block the fluid path in the portion of passage 45 that extends to the right in the drawing from passage 43. Inlet chamber 40 also communicates with outlet chamber 41 in a parallel path through by-pass passage 47 formed in piston head 37.

The piston rod extension 42 serves to provide a bearing surface for the telescoping slidable movement of valve sleeve 30 for the purpose of controlling the size of valve passage openings 44. Stop pin 50 is suitably affixed to valve sleeve 30 and limits the travel of sleeve 30 relative to extension 42 by engaging the ends 51 and 52 of radial groove 53 formed in extension 42. In the normal position, stop pin 50 is urged against groove end 52 by bias spring 31. The function of bias spring 31 is to position valve sleeve end 33 to uncover passage openings 44 in extension 42 when in the normal position.

As earlier indicated, booster motor 20 is shown in the drawing with the parts in normal position. In this condition, fluid forwarded by pump 13 enters casing 21 through inlet port 27, and flows relatively freely through inlet chamber 40, gate passage 43, axial passage 45, passage 46, outlet chamber 41 and then returns to the hydraulic system through outlet port 19. In the preferred embodiment fluid also flows from inlet chamber 40 to outlet chamber 41 through by-pass passage 47 which is a parallel path to the path through passages 43, 45 and 46. The pressures in inlet chamber 40 and outlet chamber 41 at this time are equal, therefore piston head 37 is at rest.

To operate booster motor 20, pedal 14 is depressed by the operator and valve rod 28 is advanced to the left as viewed in the drawing. The bias of spring 31 is overcome and the valve sleeve 30 of valve rod 28 advances axially in a telescoping manner over the surface and relative to piston rod extension 42 to partially cover valve passage opening 44. This restricts the flow of fluid to outlet chamber 41. Pressure builds up in inlet chamber 40 creating a pressure difference with the pressure in outlet chamber 41. Due to this pressure differential, piston head 37 is forced to the left in the drawing. Immediately, the relative movement of head 37 to valve sleeve 30 quickly uncovers valve passage opening 44 when valve sleeve 30 is stopped and the pressure difference compensates to equal the opposing force. The operator stops pedal advance when disengagement of the clutch connected at 36 on piston rod 35 is sensed. It is noted from the operation of this invention that it is possible to quickly close and reopen the passage through the piston rod thus not influencing greatly the restriction of fluid flow in this path to the steering valve 11.

It is obvious however, that valve passage opening 44 may at times be fully closed during foot pedal 14 operation. In this event, by-pass passage 47 which remains open at all times is provided to permit sufficient fluid flow to hydraulic system 10 to insure the continuous operation of power steering mechanism 11 and other system units that may be utilized. Thus, there is always communication between pump 13 and power steering valve 11 for supplying fluid thereto. Further, any system back pressures developed, such as from the operation of power steering valve 11, are transmitted directly to the pump through continuously open by-pass passage 47. This completely removes any reaction to the positioning of valve sleeve 30 or pedal 41, because sleeve 30 is a balanced sleeve presenting equal areas 32 and 33 to pressure within chamber 40.

As shown in the drawing, the present invention describes by-pass passage 47 to be formed in piston head 37 for the purpose of minimizing resistance to fluid flow and construction costs. It is apparent that other operable "by-pass" passage means may be employed. As for example, the passage could be formed in the piston rod with openings in the surface of rod portions in inlet and outlet chambers 40, 41. Also, modification of valve sleeve 30 or valve passage openings 44 is contemplated for obtaining a continuously open "by-pass" fluid flow passage. Thus, valve sleeve 30 may be formed with a portion removed from the area of overlap over one or more openings 44 such that complete restriction is prevented when valve sleeve 30 is operated to the fullest extent relative to piston rod extension 42. Or, it is obvious that one or more openings 44 may be enlarged such that complete restriction is similarly prevented. Further, stop pin 50 may be positioned for engaging piston rod extension 42 at a point short of total closing of openings 44, thereby insuring continuous fluid communication through booster motor 20. This latter arrangement is not preferred however, as greater operating pressure would be required to obtain desired booster motor 20 operation.

While a preferred embodiment of the invention has been described, it will be appreciated the invention is not limited thereto since it may be otherwise embodied within the scope of the following claims.

What is claimed is:

1. A hydraulic motor having an enclosed casing with spaced inlet and outlet ports in the casing, the inlet port being adapted to be connected to a source of pressure fluid, comprising a piston slidable in the casing intermediate the inlet and outlet ports and dividing the casing into inlet and outlet chambers, the inlet port communicating with said inlet chamber and the outlet port communicating with said outlet chamber, said piston having continuously open passage means and gate passage means communicating the inlet chamber to the outlet chamber for passing fluid therethrough; and means for decreasing the size of said gate passage means to thereby increase the fluid pressure in the inlet chamber to effect slidable movement of said piston toward the outlet chamber.

2. A hydraulic motor as defined in claim 1 wherein said piston includes a head portion with said open passage means formed therein communicating said inlet chamber to said outlet chamber for permitting continuous fluid flow from said inlet chambers to said outlet chamber and said piston includes a rod portion having said gate passage means formed therein, said gate passage means terminating in openings in said rod portion in the inlet chamber and outlet chamber, and wherein said means for decreasing the size of said gate passage means is a gate slidable on said rod portion for covering said gate passage openings in response to application of an external force.

3. A hydraulic motor as defined in claim 2 wherein said rod portion extends axially from said head portion toward the inlet chamber and said gate is a sleeve axially embracing said rod portion for telescopically covering said gate passage openings upon application of external force, said sleeve being balanced to axial fluid pressure forces within said inlet chamber by having equal opposing areas on said sleeve subjected to axial fluid pressure forces, and wherein the motor includes bias means intermediate said rod portion and said sleeve for uncovering said gate passage openings upon removal of the applied external force.

4. A hydraulic motor having a casing with spaced inlet and outlet ports in the casing, the inlet port being adapted to be connected to a source of pressure fluid, comprising a piston slidable in the casing, said piston dividing the casing into inlet and outlet chambers, said piston having passage means with openings in said inlet and outlet chambers and communicating said inlet chamber to said outlet chamber for passing fluid therethrough, said piston having means for engaging and actuating a mechanical device upon slidable movement of said piston; and means for decreasing the size of said passage means for increasing the fluid pressure in said inlet chamber and thereby effect slidable movement of said piston, said passage decreasing means adapted for closing said passage means from fully open to only partly closed and having means operable for preventing complete closing of said passage means to permit continuous fluid flow through the motor.

5. A hydraulic motor as defined in claim 4 wherein said passage means has a plurality of openings in said inlet chamber and a plurality of openings in said outlet chamber and wherein said passage decreasing means closes only a portion of said plurality of openings in said inlet chamber wherein at least one of said plurality of openings in said inlet chamber remains fully open at all times for permitting continuous fluid flow through the motor.

6. A hydraulic motor as defined in claim 4 wherein said piston includes a head portion and a rod portion, said rod portion having said passage means formed therein, said passage means terminating in openings in said rod portion surface in the inlet chamber and outlet chamber, and wherein said passage decreasing means is a gate slidable on said rod portion for covering said gate passage openings in response to application of an external force.

7. A hydraulic motor as defined in claim 6 wherein said rod portion extends from said head portion toward the inlet chamber and said gate is a sleeve embracing said rod portion for telescopically covering said gate passage openings upon application of external force and wherein the motor includes bias means intermediate said rod portion and said sleeve for uncovering said gate passage openings upon removal of the applied external force.

8. A hydraulic motor as defined in claim 7 wherein said bias means is a coil spring.

References Cited

UNITED STATES PATENTS

| | | | |
|---|---|---|---|
| 1,921,590 | 8/1953 | Staude | 91—49 |
| 2,813,519 | 11/1957 | Persson et al. | 91—49 |
| 2,957,311 | 10/1960 | Stelzer | 91—49 |
| 3,327,590 | 6/1967 | Johnson | 91—49 |

FOREIGN PATENTS 329,467  9/1935  Italy.

PAUL E. MASLOUSKY, Primary Examiner

U.S. Cl. X.R.

91—376, 431